United States Patent
Sakairi et al.

(10) Patent No.: US 10,373,127 B2
(45) Date of Patent: *Aug. 6, 2019

(54) VISUALIZING HIERARCHICAL TIME-SERIES DATA

(71) Applicant: INTERNATIONAL BUSINESS MACHINES CORPORATION, Armonk, NY (US)

(72) Inventors: Takashi Sakairi, Kanagawa-ken (JP); Ai Yoshino, Kanagawa (JP); Heather D. Achilles, Gilmanton, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,712

(22) Filed: May 30, 2018

(65) Prior Publication Data

US 2018/0276624 A1 Sep. 27, 2018

Related U.S. Application Data

(63) Continuation of application No. 14/938,552, filed on Nov. 11, 2015, now Pat. No. 10,043,159.

(51) Int. Cl.
| | |
|---|---|
| *G06Q 10/00* | (2012.01) |
| *G06T 11/20* | (2006.01) |
| *G06F 3/0484* | (2013.01) |
| *G06F 17/10* | (2006.01) |
| *G06F 17/18* | (2006.01) |

(52) U.S. Cl.
CPC ......... *G06Q 10/30* (2013.01); *G06F 3/04842* (2013.01); *G06T 11/206* (2013.01); *G06F 17/10* (2013.01); *G06F 17/18* (2013.01); *Y02W 90/20* (2015.05)

(58) Field of Classification Search
None
See application file for complete search history.

(56) References Cited

U.S. PATENT DOCUMENTS

| | | | | |
|---|---|---|---|---|
| 7,639,256 | B1 * | 12/2009 | Yablonski | G06T 11/206 345/440 |
| 2008/0235568 | A1 | 9/2008 | Malkin et al. | |
| 2010/0235771 | A1 * | 9/2010 | Gregg, III | G06T 11/206 715/769 |
| 2012/0102396 | A1 | 4/2012 | Arksey et al. | |

(Continued)

OTHER PUBLICATIONS

List of IBM Patents or Patent Applications Treated as Related dated May 30, 2018, 2 pages.

*Primary Examiner* — Saptarshi Mazumder
(74) *Attorney, Agent, or Firm* — Tutunjian & Bitetto, P.C.; Vazken Alexanian

(57) ABSTRACT

Methods and systems for visualizing data include forming hierarchically related graphs having a common time-series axis. The hierarchically related graphs are displayed in a linear arrangement, such that shared values on the common time-series axis align for each graph. The hierarchically related graphs are automatically updated in accordance with a user selection of an element in a data hierarchy by removing graphs below a lowest-order common ancestor in the data hierarchy between the user selection and a previously displayed selection and replacing the removed graphs with new graphs that reflect the user selection.

14 Claims, 6 Drawing Sheets

(56) References Cited

U.S. PATENT DOCUMENTS

2013/0055146 A1* 2/2013 Armitage .............. G06F 3/0481
 715/781
2014/0033120 A1 1/2014 Bental et al.
2014/0282175 A1 9/2014 Smith et al.

* cited by examiner

VISUALIZING HIERARCHICAL TIME-SERIES DATA

BACKGROUND

Technical Field

The present invention relates to graphical interfaces and, more particularly, to graphical user interfaces for displaying time-series data with hierarchical relationships.

Description of the Related Art

Waste management is a hallmark of civilization, and as cities grow larger, the amount of waste involved grows proportionally. Managing waste better means building an understanding of the relationships between different kinds of waste and how they are generated over time.

In one example, a materials recovery facility (MRF) is a facility where solid waste and recyclables are sorted to recover materials. The number of MRFs in the United States has grown, from 40 in 1991 to 736 in 2012. As waste comes into a MRF, the administration of the MRF depends on having an accurate picture of what types of waste are being processed and how to manage them.

One exemplary scenario includes a city that has a diversion rate of 19%, compared to the United States average of 34%, measuring the amount of waste that is diverted from landfills. This city aims to increase its diversion rates in the first year of the program to 55% and to 75% after two years. In this system, waste is sorted at a central facility, where finished goods using the recycled materials are produced on-site. The volume of different materials are tracked and analyzed to enhance waste use. However, to be a useful member of the local economy, the MRF will need to provide accurate projections of their output, just like new production provides.

Existing techniques for visualizing materials' time-series data attempt to categorize the material, but their presentation of the information is difficult to understand and can necessitate a very large amount of space dedicated to the visualization to properly display all of the information.

SUMMARY

A method for visualizing data includes forming hierarchically related graphs having a common time-series axis. The hierarchically related graphs are displayed in a linear arrangement, such that shared values on the common time-series axis align for each graph. The hierarchically related graphs are automatically updated in accordance with a user selection of an element in a data hierarchy by removing graphs below a lowest-order common ancestor in the data hierarchy between the user selection and a previously displayed selection and replacing the removed graphs with new graphs that reflect the user selection.

A system for visualizing data includes a graphing module that is configured to form hierarchically related graphs having a common time-series axis. A user interface is configured to display the hierarchically related graphs in a linear arrangement, such that shared values on the common time-series axis align for each graph, and further configured to automatically update the hierarchically related graphs in accordance with a user selection of an element in a data hierarchy by removing graphs below a lowest-order common ancestor in the data hierarchy between the user selection and a previously displayed selection and replacing the removed graphs with new graphs that reflect the user selection.

A system for visualizing data includes a graphing module having a processor configured to form a plurality of hierarchically related graphs having a common time-series axis in accordance with a user selection of an element in a data hierarchy. A user interface is configured to display the plurality of hierarchically related graphs in a linear arrangement, such that shared values on the common time-series axis align for each graph. Each graph has a parent or child relationship with each adjacent graph.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide visualizations of hierarchical time-series data. This helps users understand the breakdown of categories into sub-categories and to compare multiple time-series in a single view. To accomplish this goal, the present embodiments use a series of charts that show bar graphs along a time axis, allowing for precise breakdowns of the composition of different categories and their relationships.

Figure 1:
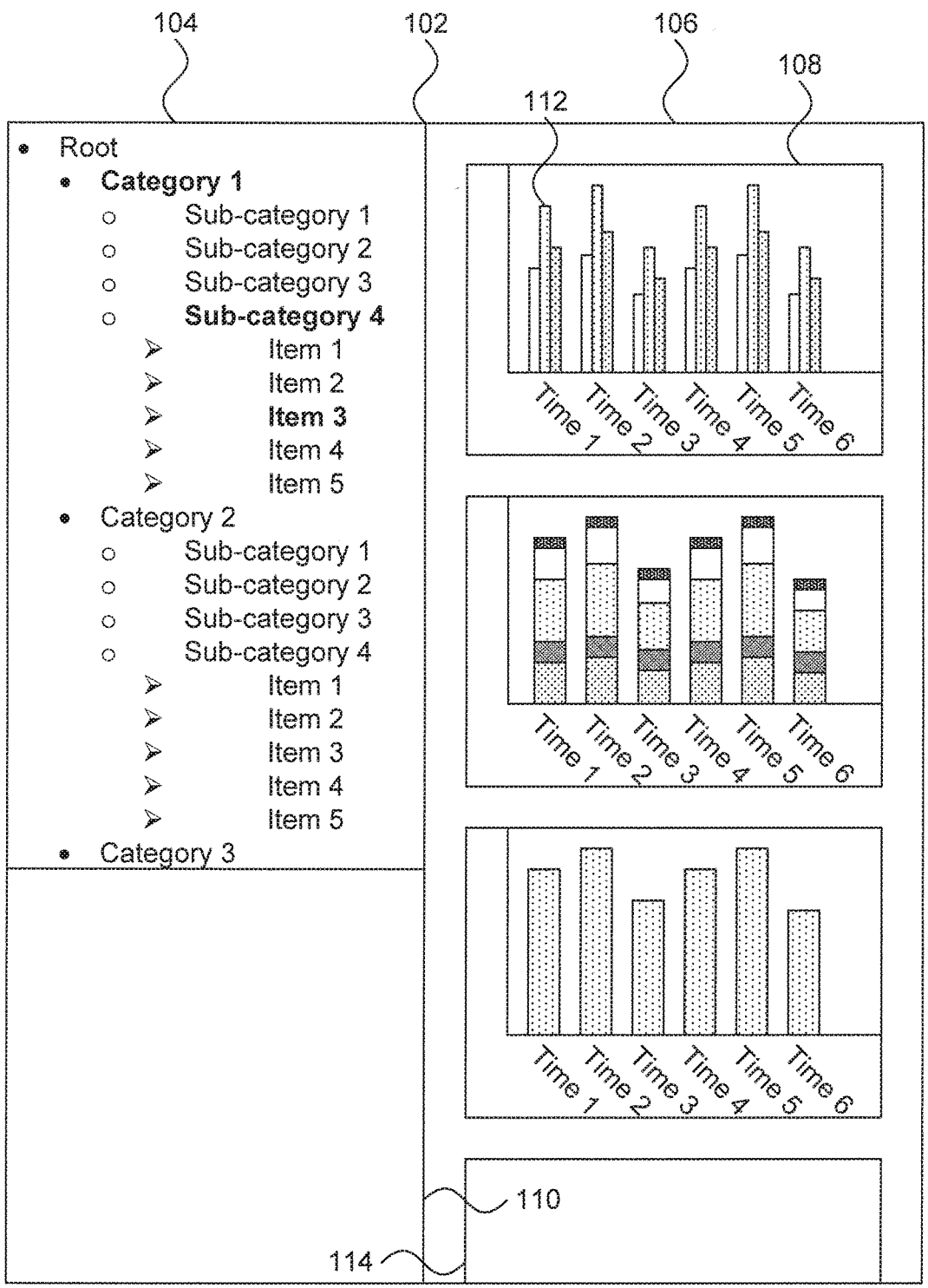
FIG. 1 is a diagram of a user interface for displaying hierarchically related time-series data for a single category hierarchy in accordance with the present principles.

Referring now to FIG. 1, a user interface 102 for visualizing hierarchical time-series data is shown. The interface includes three primary information places: a data category plane 104, a graph plane 106, and a control plane 110. The graph plane 106 includes one or more graphs 108 that correspond to selected categories, sub-categories, and items in the data category plane 104. Each graph 108 shows a breakdown 112 for a selected category in one of several different formats. The formats may include individual bar graphs for each sub-element of the selected element, a combined bar graph with different segments showing respective magnitudes of sub-elements, or a single bar showing the size of the entire element. In addition, multiple items on a given level can be selected for a single graph and compared directly. Each graph 108 shows how the selected item changes over time. This provides a direct visual comparison of parent and child time-series data. The graph pane 108 may also include a legend 114 that allows a user to select specific elements to display.

When a user selects an element from the data category pane 104, a graph 108 is generated in the graph plane 106 that may include, by default, all of the sub-elements of the selected element. By selecting multiple elements, a direct comparison of each of those categories is shown in a single graph 108. The selected categories are highlighted (in this case, shown as bold text).

The control plane 110 may include one or more options to affect the display of information in the graph plane 106. For example, an option in the control plane 110 may toggle the display of the legend 114 in the graph plane 106, allowing a user to fit more graphs 108 in the graph plane 106. Information identifying a bar or segment in a graph 108 can still be obtained by moving a pointer over the relevant graph element to display a tooltip that hovers over the graph 108 and provides additional information. Another possible option for the control plane 110 is to allow the user to toggle whether the breakdown of a given element is shown in the graphs 108.

It should be noted that the various planes in the interface 102 may be rearranged or shown in different locations and proportions. The layout shown in FIG. 1 is intended to be illustrative, not limiting. In addition, one or more of the illustrated planes may be omitted. For example, the control plane 110 may be omitted to leave more space for the data category plane 104 or the graph plane 106, with the functions of the control plane 110 being available, for example, in a menu. It should also be recognized that the graph plane 106 need not be oriented vertically, but may instead be oriented horizontally. Regardless of orientation, the graphs 108 should align in some direction, and should have a common scale on at least one of the X and Y axes, such that information may be directly compared between graphs 108. In either case, it is contemplated that the graphs 108 will be arranged linearly, either horizontally or vertically, such that the axis having the common scale for each graph 108 will align, with values of a first graph on that axis visually aligning with values of each other graph on the same axis.

Figure 2:
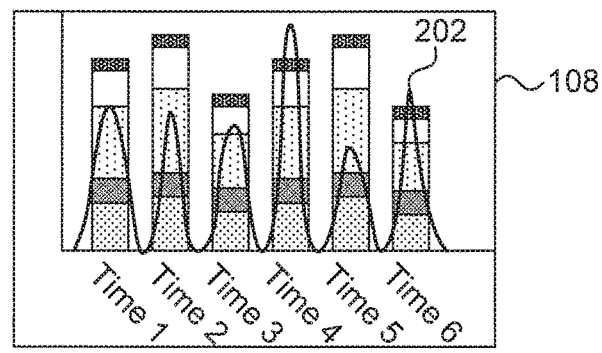
FIG. 2 is a diagram of a user interface element for overlaying multiple types of time series data accordance with the present principles.

Referring now to FIG. 2, a graph 108 is shown with additional time-series data 202 superimposed over it. This time-series data 202 can represent forecasted data (previously forecasted or looking into the future) or may represent some other form of data that would not otherwise fall into one of the categories selectable in the data category plane 104. These data 202 may be toggled using an option in the control plane. The additional time-series data 202 may represent, for example, precipitation, temperature, or population.

Although it is specifically contemplated that the present embodiments may have particular utility in the field of waste management, it should be understood that the present embodiments may be employed in any field of endeavor to help users visualize complex, hierarchical time-series data. The use of analytics in the field of waste management is in its infancy. By having an easy-to-use interface that provides intuitive features, the present embodiments allow waste management field experts to analyze the data without being particular experts in data analytics.

This is particularly advantageous in fields which deal with material in a hierarchical manner. In waste management, for example, paper waste may be divided into different sub-categories of waste such as, e.g., color, white, newsprint, magazine, etc. This sort of arrangement makes the stacked bar chart useful, as it immediately conveys the total amount of the category while also showing the breakdown of the sub-categories and their relative proportions of the total. The user can then "drill down" to specific sub-categories of interest, with each step providing more detail regarding the selected sub-category. This allows the operator to take action based on detailed information, for example decreasing the total weight and the weight of large sub-categories of waste.

However, just showing a single graph 108 may not provide all of the information an operator needs. Toward this end, the graph plane 106 shows a set of graphs 108, each graph 108 having a parent or child relationship to its adjacent graphs. This helps the operator to, for example, visualize a sub-category that makes a relatively small contribution to the total for its parent category. Thus, the scale of the child graph will be adjusted automatically to show the smaller variations in the child's data. This also helps visualize the trends in the sub-category relative to the totals for the parent category. For example, if the user is viewing the category of textiles, it would be readily apparent in this contact if the pattern of increases and decreases in the weight of all textiles is similar to the pattern of a specific sub-category, such as "feedstock," because both charts would be shown simultaneously. The user can rapidly switch between different sub-categories by interacting directly with the parent graph, selecting a new sub-category by clicking on it in the graph or by manually selecting it in the data category plane 104.

For sub-categories that have children, being able to drill down in this fashion and visualize the details of the grandparent, parent, and child graph all at once gives the user a simple way to look at trends and spot anomalies. For example, if "feedstock" has a child category of "magazines," the user can see "paper," "feedstock," and "magazines" all in a single view. This can allow a user to see, for example, that a specific sub-category is not behaving as expected according to the trends of its parents. For example, if the "magazine" chart shows a dropoff in volume without a corresponding dropoff in other types of waste, this prompts the operator to ask whether there is an operations problem or a fault in data recording. The user can thereby quickly identify anomalies and recognize trends, which can facilitate improvements in operations.

To use another example, consider a materials recovery facility (MRF) that sorts steel and many types of feedstock from weight. In this example, steel has a parent category of "metals", and the increases and decreases of weight of steel are almost the same as the changes to the metals category as a whole. In other words, the volume of steel dominates the metals category. However, in one scenario, the weight of steel decreased compared to the expected weight based on the weight of the "metals" category. This is immediately apparent because the "metals" and "steel" charts are shown simultaneously, allowing an operator to directly compare the two.

The operator can then take measures to learn more and correct any problems. For example, the problem may be that the steel's sorting machine has declined in its capability (for example because of a mechanical problem or because of the inoperability of one or more parts of a sorting facility). The operator can then see to it that the sorter is repaired.

One way to assist in spotting such trends is to make one axis of the graphs 108 follow the same scale. If the graphs 108 are arranged vertically, then the horizontal axis should be on the same scale. If this axis is time, then the graphs 108 will be aligned such that horizontal values on a first graph correspond with the same horizontal values on a second graph. In an alternative embodiment, graph panel 106 may be oriented horizontally, with the graphs 108 being displayed left-to-right. In this case, the scales of the respective vertical axes may be made to share common values, such that the vertical values of each graph correspond with the same vertical values of adjacent graphs. When this is the case, then the labels for the axis having the common scale need only be shown once, as it will be consistent across all graphs. The axis labels can then be dynamically shown and hidden as a user scrolls between graphs 108.

Figure 3:
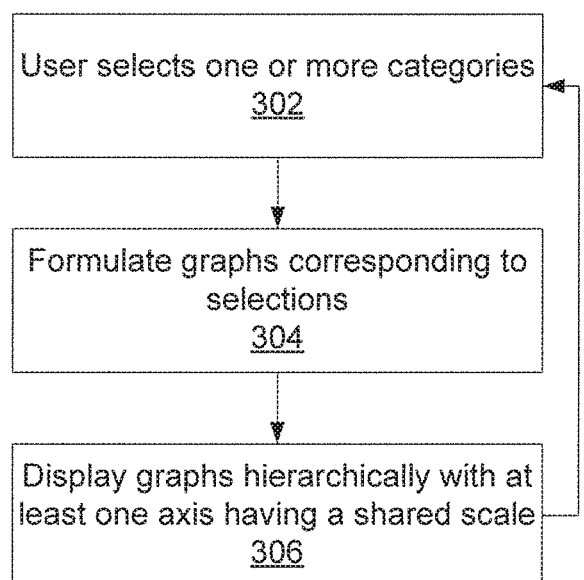
FIG. 3 is a block/flow diagram of a method for displaying hierarchically related time-series data in accordance with the present principles.

Referring now to FIG. 3, a method of visualizing hierarchical, time-series data is shown. In block 302, a user selects one or more elements from the data category plane 104 or by directly interacting with an existing graph 108 in the graph plane 106. Block 304 then formulates the graphs that correspond to the user's selections. Block 306 displays the graphs hierarchically in the graph plane 106, with parent graphs being oriented, e.g., above child graphs. The graphs 108 displayed by block 306 share a consistent scale on their respective time axes, such that time-series information can be directly compared between neighboring graphs 108.

When the user selects a category that shares some of the hierarchy with a previous selection, block 304 need not formulate all of the graphs over again. Instead, a lowest-order common ancestor for the new selection and the old selection are determined by traversing the hierarchy of categories up until reaching a category that is in the old set of graphs. Block 304 then calculates new graphs only for the selected categories below that lowest-order common ancestor and block 306 replaces any outdated graphs with the newly formulated graphs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
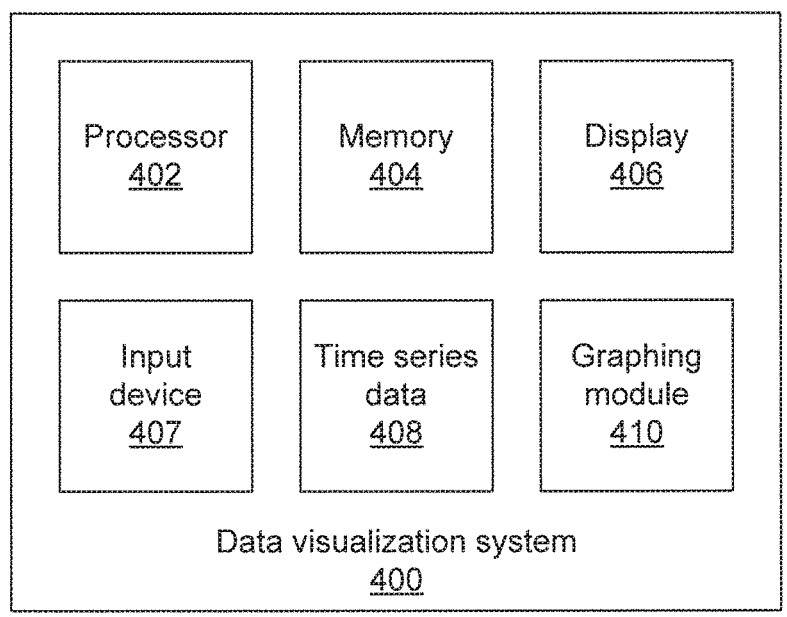
FIG. 4 is a block diagram of a system for displaying hierarchically related time-series data in accordance with the present principles.

Referring now to FIG. 4, a system for visualizing hierarchical, time-series data 400 is shown. The system 400 includes a hardware processor 402 and memory 404. A display 406 and an input device form a user interface, allowing the system 400 to display graphical and textual information to a user and to receive commands from the user. The system 400 includes one or more modules, each of which may be implemented as software running on the processor 402. Alternatively, the modules may be implemented as standalone hardware devices in the form of, e.g., an application specific integrated chip or field programmable gate array.

The system 400 stores time-series data 408 in memory 404. A graphing module 410 formulates graphs 108 relating to the time-series data 408 in response to a user's command and the display 406 displays these graphs 108 in a hierarchical fashion in, e.g., graph plane 106. The graphing module 410 continues to accept the user's inputs and updates the information shown on display 406 in response.

Figure 5:
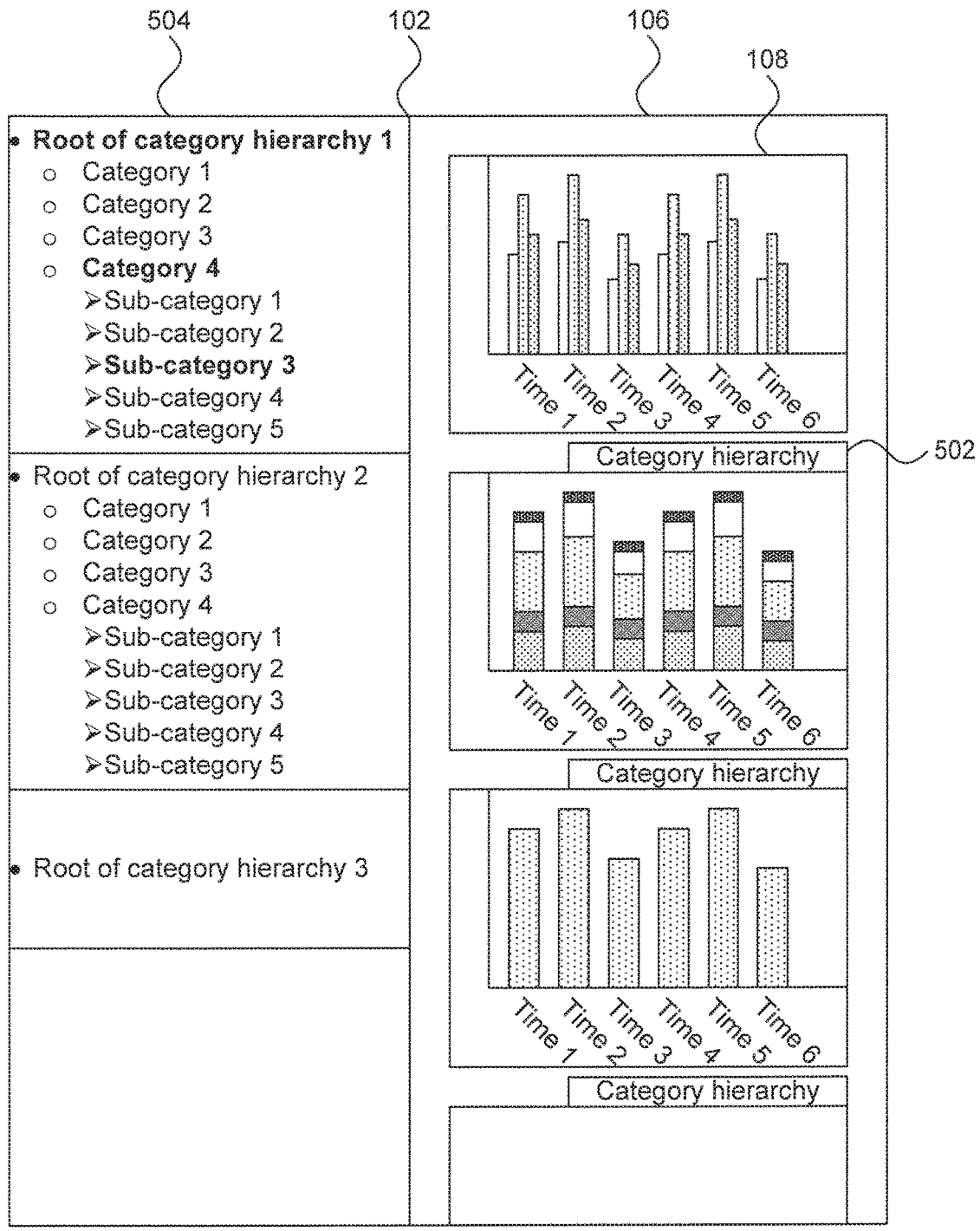
FIG. 5 is a diagram of a user interface for displaying hierarchically related time-series data for multiple category hierarchies in accordance with the present principles.

Referring now to FIG. 5, an alternate embodiment is shown that provides the option of performing selection of categories using a widget directly on the graph plane 106. For example, the widget 502 allows a user to select a category hierarchy for a given graph 108. It is specifically contemplated that the graphs 108 are all hierarchically related to one another. In other words, each graph 108 should all have a parent-child relationship to adjacent graphs 108.

In addition, this embodiment shows a set of different category hierarchies 504, each with a distinct category root. These different hierarchies correspond to the options available in the widget 502, such that the widget switches between category hierarchies.

Figure 6:
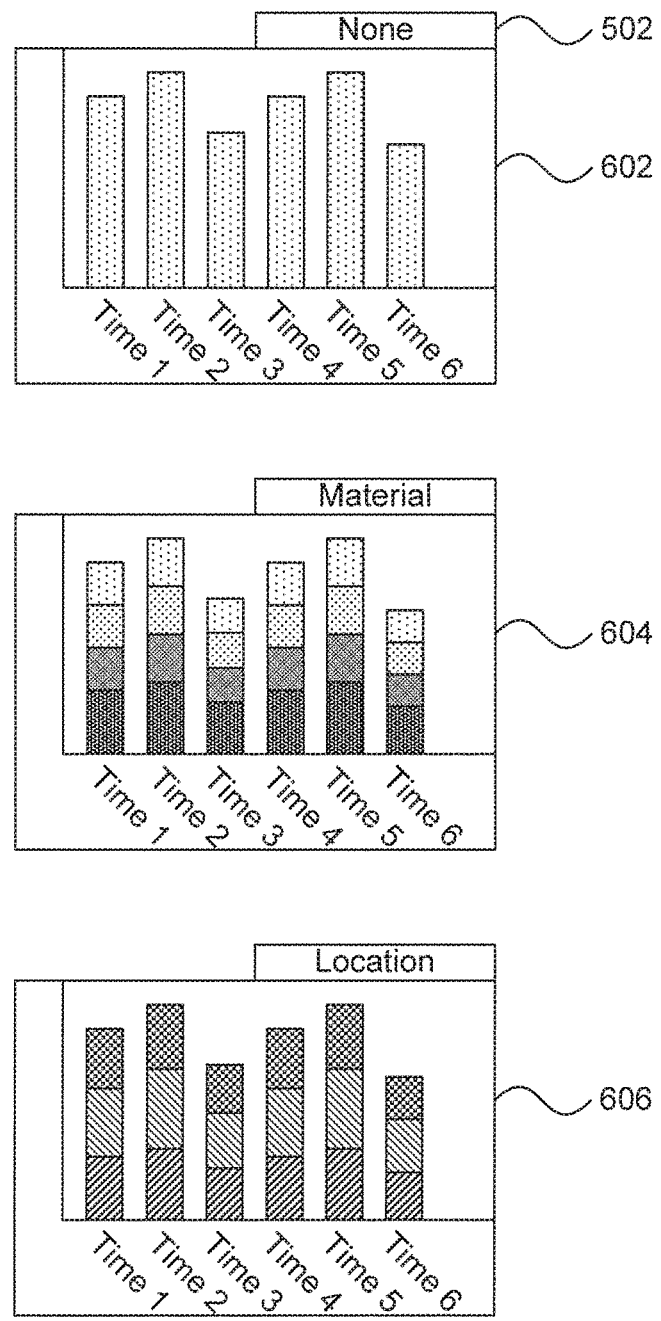
FIG. 6 is a diagram of a user interface element for switching between categories of hierarchically related time-series data in accordance with the present principles.

Referring now to FIG. 6, it is shown how the widget 502 can be used to display multiple orthogonal categories. A first graph 602 shows the widget 502 being set to "none," with no category being selected. Each bar of the graph shows the total material at each point in time. In a second graph 604, the widget 502 is set to "Material," with the same totals now being divided into different types of material. Similarly the third graph 606 has the widget 502 set to "Location," with the totals being divided up into the different locations. Selecting one of the regions of one of the bar graphs will select that specific category and display a new graph below that shows further breakdowns. For example, if the user selected a specific state (e.g., New York) from one of the bars on graph 606, a new graph would be generated (as in FIG. 5) that shows a further breakdown by, e.g., region or city.

Figure 7:
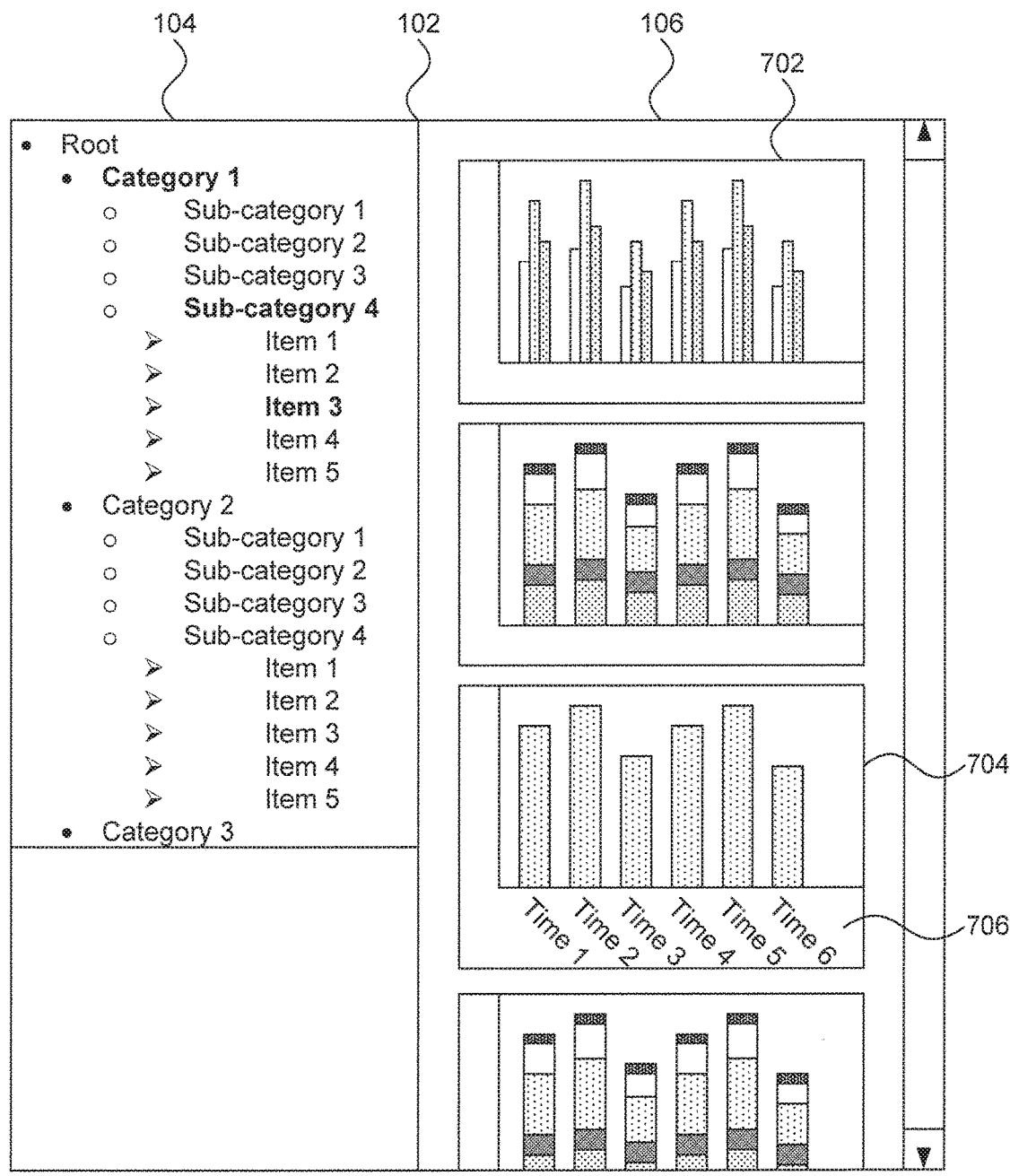
FIG. 7 is a diagram of a user interface for displaying hierarchically related time-series data in accordance with the present principles.

Referring now to FIG. 7, an alternate embodiment is shown where markers on the time axis of the graphs are compressed to save space. In particular, graphs 702 that are on top of the graph plane 106 have their labels suppressed, with only the bottom graph 704 showing the time labels 706. For a long series of graphs 108, where the bottommost graph may fall outside the visible portion of the graph plane 106, the bottommost graph that is fully visible will be displayed with its labels. The graph plane 106 will then dynamically adjust the displayed graphs as a user scrolls through the graphs, adding and removing labels as needed.

Having described preferred embodiments of visualizing hierarchical time-series data (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for visualizing data, comprising:
　　forming a plurality of hierarchically related graphs having a common time-series axis;
　　displaying the plurality of hierarchically related graphs in a linear arrangement, such that shared values on the common time-series axis align for each graph; and automatically updating the plurality of hierarchically related graphs in accordance with a user selection of an element in a data hierarchy by removing graphs below a lowest-order common ancestor in the data hierarchy between the user selection and a previously displayed selection and replacing the removed graphs with new graphs that reflect the user selection.

2. The method of claim 1, wherein a graph that is lower-order in the hierarchy shows a more detailed breakdown of at least one element of a respective graph that is higher-order in the hierarchy.

3. The method of claim 1, wherein each graph that includes multiple categories arranges the multiple categories in a vertical bar with magnitudes of each of the multiple categories adding to form a magnitude of the vertical bar.

4. The method of claim 1, wherein automatically updating the plurality of hierarchically related graphs comprises removing graphs that are not included in a hierarchy of the user selection and replacing the removed graphs with new graphs that reflect the user selection.

5. The method of claim 1, further comprising displaying information regarding a category in a graph in response to a user's interaction with the graph through an input interface.

6. A non-transitory computer readable storage medium comprising a computer readable program for visualizing data, wherein the computer readable program when executed on a computer causes the computer to perform the steps of:

forming a plurality of hierarchically related graphs having a common time-series axis;

displaying the plurality of hierarchically related graphs in a linear arrangement, such that shared values on the common time-series axis align for each graph; and automatically updating the plurality of hierarchically related graphs in accordance with a user selection of an element in a data hierarchy by removing graphs below a lowest-order common ancestor in the data hierarchy between the user selection and a previously displayed selection and replacing the removed graphs with new graphs that reflect the user selection.

7. A system for visualizing data, comprising:

a graphing module comprising a processor configured to form a plurality of hierarchically related graphs having a common time-series axis; and a user interface configured to display the plurality of hierarchically related graphs in a linear arrangement, such that shared values on the common time-series axis align for each graph, and further configured to automatically update the plurality of hierarchically related graphs in accordance with a user selection of an element in a data hierarchy by removing graphs below a lowest-order common ancestor in the data hierarchy between the user selection and a previously displayed selection and replacing the removed graphs with new graphs that reflect the user selection.

8. The system of claim 7, wherein the user interface is further configured to display the plurality of hierarchically related graphs such that a graph that is lower-order in the hierarchy shows a more detailed breakdown of at least one element of a respective graph that is higher-order in the hierarchy.

9. The system of claim 7, wherein, for each graph that includes multiple categories, the user interface is further configured to arrange the multiple categories in a vertical bar with magnitudes of each of the multiple categories adding to form a magnitude of the vertical bar.

10. The system of claim 7, wherein the user interface comprises a graph plane that includes the plurality of hierarchically related graphs.

11. The system of claim 10, wherein the user interface is further configured to display a data category plane that accepts user input in a hierarchy of data categories to select which data categories to display in the plurality of hierarchically related graphs.

12. The system of claim 7, wherein the user interface is further configured to remove graphs that are not included in a hierarchy of the user selection and to replace the removed graphs with new graphs that reflect the user selection.

13. The system of claim 7, wherein the user interface is further configured to display information regarding a category in a graph in response to a user's interaction with the graph through an input interface.

14. The system of claim 7, wherein the user interface is further configured to display a control plane that includes user-selectable options for altering one or more display properties of the plurality of hierarchically related graphs.

* * * * *